United States Patent
Liot et al.

(10) Patent No.: US 6,304,646 B1
(45) Date of Patent: Oct. 16, 2001

(54) MAN-MACHINE INTERFACE DEVICE FOR TELEPHONE TERMINALS

(75) Inventors: Patrick Liot, Paris; Francis Pinault, Bois Colombes; Frédéric Vasnier, Colombes, all of (FR)

(73) Assignee: Alcatel Mobile Phones, Paris (FR)

( * ) Notice: Subject to any disclaimer, the term of this patent is extended or adjusted under 35 U.S.C. 154(b) by 0 days.

(21) Appl. No.: 08/859,907

(22) Filed: May 21, 1997

(30) Foreign Application Priority Data

May 24, 1996 (FR) .................................................. 96 06502

(51) Int. Cl.$^7$ ............................ H04M 3/42; H04M 1/247
(52) U.S. Cl. .................... 379/201.04; 379/368; 379/915; 379/916
(58) Field of Search ..................................... 379/201, 355, 379/356, 357, 368, 387, 419, 914, 915, 916, 201.04, 387.01; 455/95, 154.2, 575

(56) References Cited

U.S. PATENT DOCUMENTS

| | | | |
|---|---|---|---|
| 4,788,720 | 11/1988 | Brennan et al. | 379/201 |
| 4,928,306 * | 5/1990 | Biswas et al. | 379/201 |
| 5,371,785 * | 12/1994 | Marcinkiewicz | 379/201 X |
| 5,373,551 * | 12/1994 | Baals et al. | 379/355 X |
| 5,386,460 | 1/1995 | Boakes et al. | 379/457 |
| 5,402,477 | 3/1995 | McMahan et al. | 379/201 |
| 5,425,077 * | 6/1995 | Tsoi | 379/201 X |
| 5,615,257 * | 3/1997 | Pezzullo et al. | 379/396 |
| 5,619,684 * | 4/1997 | Goodwin et al. | 710/62 |
| 5,761,610 * | 6/1998 | Sorensen et al. | 455/575 |
| 5,790,652 * | 8/1998 | Gulley et al. | 379/356 X |

FOREIGN PATENT DOCUMENTS

| | | | |
|---|---|---|---|
| 4306198A1 | 9/1994 | (DE) | H04M/1/00 |
| 195 34 789 A1 | 3/1996 | (DE) | 455/575 |
| 0 695 072 A2 | 1/1996 | (EP) | 710/62 |
| 2 731 578 | 9/1996 | (FR) | H04Q/7/32 |
| 2162393A | 1/1986 | (GB) | H04B/1/00 |
| 2 285 897 A | 7/1995 | (GB) | H04M/1/00 |
| WO9512267 | 5/1995 | (WO) | H04M/3/00 |
| 96 02049 | 1/1996 | (WO) | G09G/5/00 |

OTHER PUBLICATIONS

Schwartz et al, "Dual–Media Messaging Using Screen Telephones on the Telephone Network", Proceedings of the International Conference on Communications (ICC), Geneva, May 23–26, 1993, vol. 1–2–03, May 23, 1993, Institute of Electrical and Electronics Enigneers, pp. 1183–1188.

* cited by examiner

Primary Examiner—Harry S. Hong
(74) Attorney, Agent, or Firm—Sughrue, Mion, Zinn, Macpeak & Seas, PLLC

(57) ABSTRACT

A man-machine interface device for a telephone terminal for selecting options offered to the user when using services offering such options indicates to the terminal the various options that can be selected and determines, in a manner specific to each terminal, the mode of presentation of the options to the user for the purpose of making the selection.

13 Claims, 1 Drawing Sheet

MAN-MACHINE INTERFACE DEVICE FOR TELEPHONE TERMINALS

BACKGROUND OF THE INVENTION

1. Field of the Invention

The present invention concerns a man-machine interface device for telephone terminals.

2. Description of the Prior Art

In addition to communication means enabling the user to communicate using the terminal, a telephone terminal usually includes a man-machine interface including means enabling the user to enter terminal control data, including a keypad for entering the numbers needed to set up calls.

Control data can also be entered during a call accessing certain services, for example services using servers supplying pre-recorded spoken information, in response to various options proposed to the user when accessing such services.

Entering such control data by means of the keys of the dialing keypad to command the generation of multifrequency signals is known in itself, the correspondence between the various options proposed and these various keys being indicated in a help message transmitted to the user in text or voice form.

This procedure has the drawback of being less than optimal since listening to or reading such help messages is irksome to the user, wastes a great deal of time and introduces an additional level of complexity for the user, namely the necessity to establish a correspondence between an option to be selected and a dialing key to be pressed.

Avoiding such drawbacks by providing the terminal with dedicated keys, also known as "soft keys", and selecting an option by pressing the key next to a text corresponding to that option displayed on the screen are also known in themselves.

One such solution is described in "ADSI: A new age of interactive services" by J. Brad Johns, 7th World Telecommunication Forum, Telecom 95 Geneva, vol. 1, pp 405–408.

However, in this solution the mode of presentation of said options to the user is determined at the remote terminal equipment (server or central office) rather than in the terminal itself.

Accordingly, in both these prior art solutions the mode of presentation of said options to the user is determined at the remote terminal equipment, the essential disadvantage of which is that no difference of mode of presentation is allowed from one terminal to another. Depending on the ergonomic features of the terminal, or merely the preferences of the user, one mode of presentation may be found to be more suitable than another, for greater user friendliness.

An aim of the present invention is to avoid the above drawbacks.

SUMMARY OF THE INVENTION

Accordingly, the present invention consists in a man-machine interface device for a telephone terminal for selecting options offered to the user of said terminal when using services offering such options, including means for indicating to the terminal the various options that can be selected and means for determining, in a manner specific to each terminal, the mode of presentation of said options to said user for the purpose of making said selection.

Other objects and features of the present invention will emerge from a reading of the following description of embodiments of the invention given with reference to the accompanying drawings.

DETAILED DESCRIPTION OF THE PREFERRED EMBODIMENTS

Figure 1:
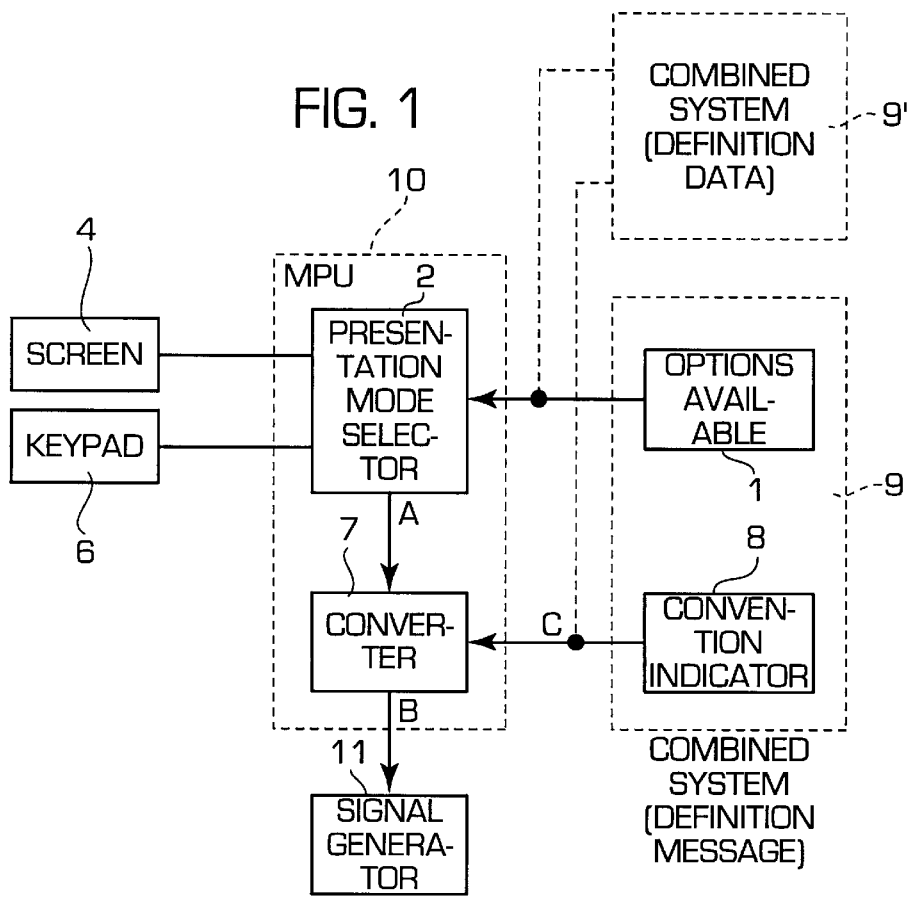
FIG. 1 is a general block schematic of one embodiment of a man-machine interface device of the invention.

The man-machine interface as shown in FIG. 1 includes:

means 1 for indicating to the terminal the various options that can be selected, and means 2 for determining, in a manner specific to each terminal, the mode of presentation to the user of the selectable options, for the purpose of making said selection.

For example, the means 2 for determining in a manner specific to the terminal the mode of presentation of said options, for the purpose of making said selection, include means controlled by the means 1 for indicating to the terminal the various options that can be selected and, by means of techniques that are known in themselves and are not described again here, determining a menu to be displayed on a screen 4 and the mode of designating an option from that menu. This mode of designation can consist in the user controlling the position of a cursor on the screen by means of a corresponding device of the keypad 6, for example, or activation of one of a number of function keys of the keypad 6, respectively associated with different positions of a cursor on the screen.

As indicated above, because the mode of presentation is determined in a manner that is specific to each terminal, other modes of presentation are therefore possible.

In the embodiment shown in FIG. 1, the option selected is signaled to the remote terminal equipment with which said terminal is communicating by means of a particular signal (for example a multifrequency signal) sent by the terminal and corresponding to that option, in accordance with a given convention, the man-machine interface device further including converter means 7 for converting the result of the selection (A) into a command (B) for sending by the terminal of a signal corresponding to the selected option, in accordance with said convention (C), the content of which is indicated by means 8 for indicating said convention to the terminal.

For example, the converter means 7 may simply consist in a memory for storing a correspondence table made up of all the pairs A-B constituting the convention C and which, when addressed by a selected option A, supplies the corresponding command B.

The means 8 for indicating said convention to the terminal can include means for receiving a definition message including said convention.

The terminal can receive a definition message of this kind during the call in question, for example instead of the help message used in the prior art, as mentioned above. Unlike a help message of this kind, a definition message of this kind is not comprehensible to the user but only to the machine, and its reception is transparent for the user.

To give another example, corresponding more particularly to a GSM type mobile telephone terminal, for example, a definition message of this kind could be received on a common channel, rather than a dedicated channel allocated for a call, in other words it could be broadcast, independently of any particular call, on a BCCH frequency common to different terminals.

To give another example, the means 8 for indicating said convention to the terminal can include data storage means (for example a smart card) adapted to be inserted into the terminal to enable it to be used and storing definition data including said convention. The definition data can then be read at any time by the terminal.

The various options that can be selected can be indicated to the terminal in the same manner as said convention, in which case the means 1 and 8 can be combined in a single system. The definition message, or the definition data, as appropriate, then include(s) the various options that can be selected, in addition to said convention. In the case of a definition message, this system 9 consists in receiver means in the terminal to receive said definition message. In the case of definition data the system 9' consists in data storage means (for example a smart card) for storing said definition data, this system 9' being shown in dashed outline to indicate both possibilities.

The system formed by the means 2 and 7 can be included in a more generalized data processing system 10 (for example a microprocessor) using conventional communication techniques to communicate with:

the keypad 6 and the screen 4, the means 9 or 9', as appropriate, means 11 for generating signals to be sent by the terminal (for example multifrequency signals) and corresponding to the various options that can be selected.

Figure 2:
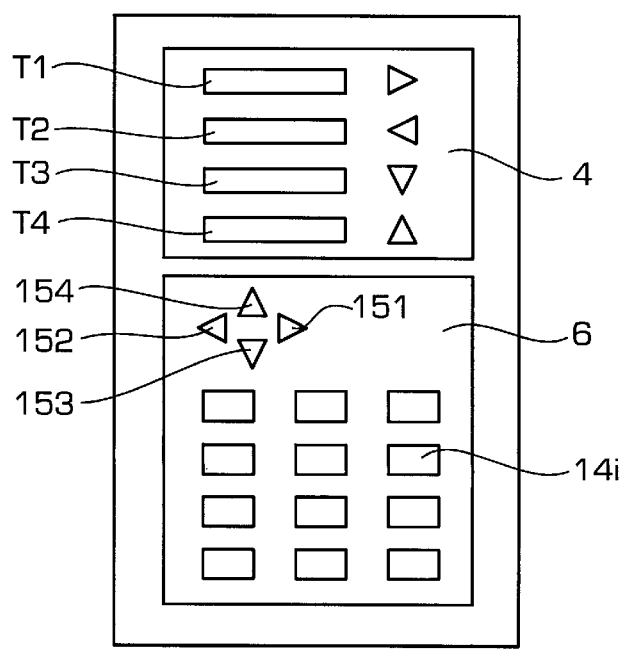
FIG. 2 is a schematic illustrating one example of a mode of presentation in accordance with the invention.

The example of a mode of presentation shown in FIG. 2 corresponds to the selection of an option from a menu shown on the screen by activating one of a number of function keys, in this example navigation keys respectively associated with different positions of a cursor on the screen.

FIG. 2 is a schematic representation of the front face of a telephone terminal including a keypad 6 and a screen 4. In the example shown, in addition to the dialing keys 14*i* enabling the user to enter the numbers needed to set up calls, the keypad 6 includes navigation keys 151 through 154 conventionally enabling the user to scroll through a menu displayed on the screen 4 to select a particular mode of operation of the terminal, a given telephone number from a directory, etc.

In the example of the operation of the selector means of the invention shown in this figure, these navigation keys have another function (in addition to or instead of the previous function), namely that of being associated with respective different positions of a cursor on the screen to designate an option from a menu associated with this cursor position, the menu here being a menu being made up of different options offered to the user during a call when using services proposing such options.

The symbol on the screen corresponding to each of these navigation keys is that associated with a brief text describing each option.

For example, in the case of access to a voice mail service:

the symbol representing a movement to the right, associated with the key 151, is associated with a text T1 corresponding to the option "Next message", the symbol representing a movement to the left, associated with the key 152, is associated with a text T2 corresponding to the option "Previous message", the symbol representing a movement downwards, associated with the key 153, is associated with a text T3 corresponding to the option "Remove a message", and the symbol representing a movement upwards, associated with the key 154, is associated with a text T4 corresponding to the option "Store a message".

In this example the various symbols corresponding to the various navigation keys (in particular the symbols representing a movement towards the right or the left, respectively associated with the "Next message" and "Previous message" options, have the additional advantage that they can be associated in a relatively natural way by the user with the various corresponding options, which improves the ergonomics of the system and therefore makes it more user friendly.

There is claimed:

1. A man-machine interface device for a telephone terminal for making a selection of options offered to the user of said terminal when using services offering such options, including indicating means for indicating to said terminal the various options that can be selected and determining means for determining, in a manner specific to said terminal, the mode of presentation of said options to said user such that said user can make said selection using said terminal and using alternative selection techniques.

2. The device claimed in claim 1 wherein said means for determining said mode of presentation in a manner specific to said terminal include means for determining in a manner specific to said terminal a menu to be displayed on a screen of said terminal and the mode of designation of an option from said menu.

3. The device claimed in claim 2 wherein said mode of designation consists in the activation of one of a plurality of function keys of a keypad of said terminal respectively associated with different positions of a cursor on said screen.

4. The device claimed in claim 3 wherein said function keys are navigation keys.

5. The device claimed in claim 1 wherein a selected option is signaled to terminal equipment which is remote from said terminal and with which said terminal is communicating by means of a particular signal sent by said terminal and corresponding to that option in accordance with a given convention and said device further includes means for indicating to said terminal the content of said convention and converter means for converting the result of said selection into a command for sending by said terminal of a signal associated with the selected option in accordance with said convention.

6. The device claimed in claim 5 wherein said means for indicating to said terminal the content of said convention include means for receiving a definition message transmitted by said terminal equipment, which is remote from said terminal, and including said convention.

7. The device claimed in claim 5 wherein said means for indicating the content of said convention to said terminal include data storage means adapted to be inserted into said terminal to enable it to be used and adapted to store definition data including said convention.

8. The device claimed in claim 1 wherein said means for indicating to said terminal the various options that can be selected include means for receiving a definition message transmitted by terminal equipment which is remote from said terminal and with which said terminal is communicating and including said options that can be selected.

9. The device claimed in claim 1 wherein said means for indicating to said terminal the various options that can be selected include definition data storage means adapted to be inserted into said terminal to enable it to be used, said definition data including said options that can be selected.

10. The device claimed in claim 1 wherein a selected option is signaled to a server with which said terminal is communicating by means of a particular signal sent by said terminal and corresponding to that option in accordance with a given convention and said device further includes means for indicating to said terminal the content of said convention and converter means for converting the result of said selection into a command for sending by said terminal of a signal associated with the selected option in accordance with said convention.

11. The device claimed in claim 1 wherein a selected option is signaled to a central office with which said terminal is communicating by means of a particular signal sent by said terminal and corresponding to that option in accordance with a given convention and said device further includes means for indicating to said terminal the content of said convention and converter means for converting the result of said selection into a command for sending by said terminal of a signal associated with the selected option in accordance with said convention.

12. The device claimed in claim 5 wherein said data storage means comprises a smart card.

13. The device claimed in claim 1 wherein said definition data storage means comprises a smart card.

* * * * *